(12) United States Patent
Åström et al.

(10) Patent No.: US 6,193,446 B1
(45) Date of Patent: Feb. 27, 2001

(54) INDEXABLE INSERT FOR ROTARY MILLING TOOLS

(75) Inventors: Magnus Åström; Lars-Ola Hansson, both of Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/387,503

(22) Filed: Sep. 1, 1999

(30) Foreign Application Priority Data

Sep. 2, 1998 (SE) .................................... 9802983

(51) Int. Cl.$^7$ ....................................... B23B 27/22
(52) U.S. Cl. ......................... 407/114; 407/115; 407/116
(58) Field of Search .................................. 407/114, 113, 407/115, 116

(56) References Cited

U.S. PATENT DOCUMENTS

| | | |
|---|---|---|
| 5,032,049 * | 7/1991 | Hessman et al. ............. 407/114 X |
| 5,078,550 | 1/1992 | Setran et al. . |
| 5,203,649 * | 4/1993 | Katbi et al. ..................... 407/114 |
| 5,460,464 * | 10/1995 | Arail et al. ..................... 407/114 |

\* cited by examiner

Primary Examiner—Henry Tsai
(74) Attorney, Agent, or Firm—Burns, Doane, Swecker & Mathis, L.L.P.

(57) ABSTRACT

A cutting insert includes an upper chip surface, a bottom surface and side faces therebetween. At each of the end faces the cutting insert has axially protruding portions, each of which appears with a bevel face. Main cutting edges are provided in the intersection between the chip surface and the side surfaces. On each side surface is provided a clearance surface formed on a protruding portion which via a step clearance extends into a secondary helically twisted clearance surface, the chip angle of which increases with increasing cutting depth. The upper face includes along the main cutting edges a planar inclined surface with constant width that extends inwards and intersects with an upwardly inclined secondary chip breaking surface.

13 Claims, 3 Drawing Sheets

INDEXABLE INSERT FOR ROTARY MILLING TOOLS

BACKGROUND OF THE INVENTION

The present invention relates to a new type of polygonal cutting insert for application in rotary milling tools for machining of metallic workpieces. In particular, the invention relates to a new type of cutting insert with optimized insert geometry so as to be useful in both end mills and milling cutters for flat milling.

Milling inserts are generally manufactured through form pressing and sintering of a powder capable of forming a cutting element. The development is concentrated today on positive cutting edges with positive rake angles since these showed the ability to reduce the cutting forces and the power supply needed in a tooling machine at the same time as undesirable vibrations can be diminished thereby. It is often aimed to provide the tool with a geometry implying a positive axial angle and simultaneously a negative radial angle. In certain cases also a combination of positive axial angle and zero degree radial angle can be used in order to obtain a helical chip that provides best chip transport. The cutting insert is usually clamped with a center locking screw in order to provide the best possibilities for chip transport without problems.

One of drawbacks with existing indexable inserts normally used for end mills has been that they do not entirely avoid problems involving chip entanglement. This problem occurs specifically during the machining of materials that result in long chips. As a solution of this problem, it has been proposed to use a cutting insert, the cutting edges of which are spirally curved. European Document 0 416 901 (corresponding to U.S. Pat. No. 5,078,550) shows and describes such a tool. With such spiral cutting edges the cutting edge can easier come into engagement with the workpiece with an inclined curve of the cutting force up to a maximum value which lies under the value achieved with a straight cutting edge. The tool has in this way obtained a somewhat better stability, but the problem with chip entanglement has remained unresolved when using inserts with a central hole, especially during the machining of long chip producing materials.

In view hereof it is a purpose of the invention to achieve a modified cutting insert of the type described in U.S. Pat. No. 5,078,550, with improved geometrical optimization, implying constant functional edge angle in combination with step clearance along a wave shaped edge line intended to be mounted with large axial inclination in the tool at the same time as the rake face has obtained a more optimized contour.

SUMMARY OF THE INVENTION

The invention relates to a cutting insert for chip forming machining. The insert comprises a basically polygonal body which includes an upper chip surface, a planar bottom surface, and first and second peripheral side surfaces therebetween which respectively form a plurality of main cutting edges and a plurality of secondary cutting edges at an intersection with the upper face. Each main and secondary cutting edge has a chamfer. The secondary cutting edges are provided on respective cutting corners of the body which protrude from a remainder of the body. Each of the first peripheral side surfaces has a width increasing toward the respective cutting corner such that the cutting corner becomes situated on a raised portion of the insert body. Sloping surfaces extend inwards from the chamfers from the main and secondary cutting edges and at least one upper chip surface is arranged inside each of the sloping surfaces while extending toward a center of the insert so as to provide chip curling zones therebetween. The improvement involves:

a) the first and second peripheral surfaces being inclined at an acute angle from the upper surface, whereby the upper portions of at least two opposed ones of the peripheral surfaces define a clearance surface, whereby both the clearance surface and a lower portion of the respective peripheral side surface have a generally helical contour along their entire length, b) each of the sloping surfaces forming a primary chip breaking surface next to the respective main cutting edge and extending generally helically along its entire length and having a constant width along the entire main cutting edge, and c) each of the primary chip breaking faces extending inwards to an upwardly inclined surface defining a secondary chip breaker surface such that a V-shaped chip curling cavity is formed threrebetween.

BRIEF DESCRIPTION OF THE DRAWING

The invention will now be described in more detail in connection with the preferred embodiments as shown in the enclosed drawings wherein.

DETAILED DESCRIPTION OF PREFERRED EMBODIMENTS OF THE INVENTION

Figure 1:
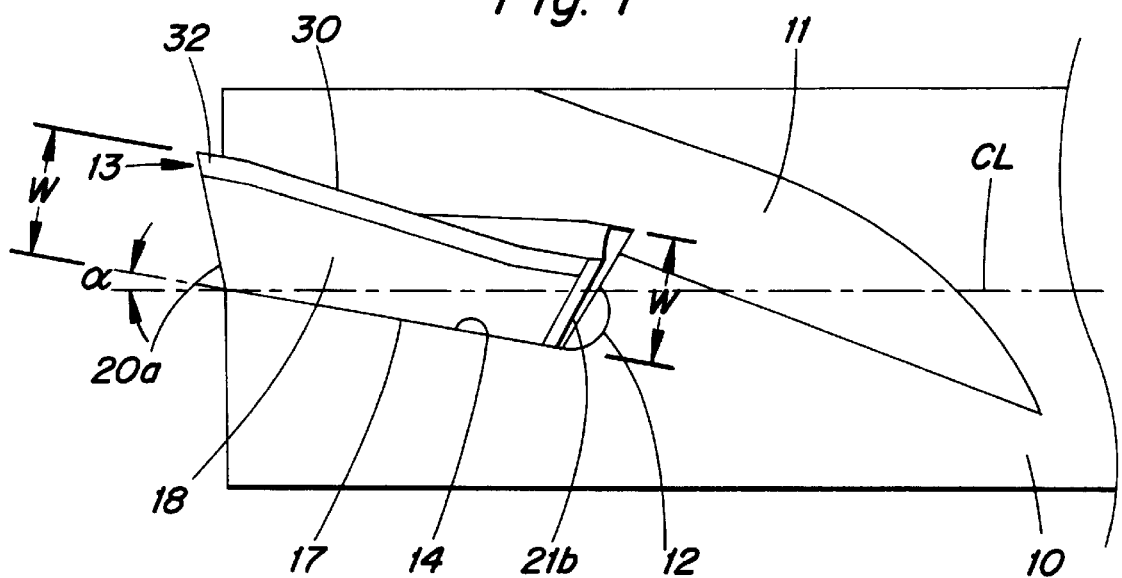
FIG. 1 shows a side view of a milling body with a clamped cutting insert according to the invention.
Figure 2:
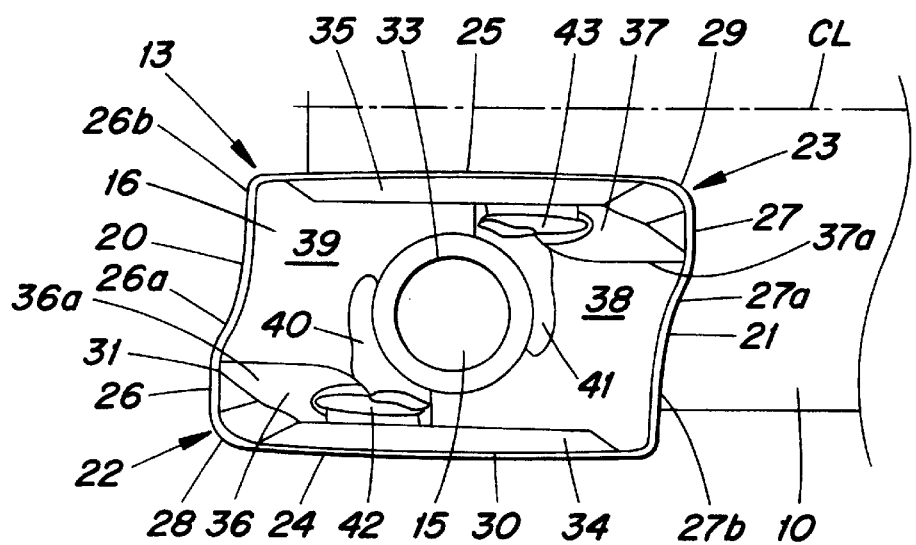
FIG. 2 shows a top plan view of the tool according to FIG. 1.

In FIGS. 1–2 is illustrated an embodiment of an end mill, which is provided with a prismatic elongated indexable insert 13 according to the invention. Such a cutting insert is produced by means of a direct pressing method in which a cemented carbide forming powder is first given a desired shape in a press and then is sintered in an oven at a temperature above 1000° C. The shrinking obtained during the sintering is something that must be considered when dimensioning the press device. The end mill comprises an essentially cylindrically shaped support body 10, the rear upper part (not shown) of which is conical and intended to be clamped in a chuck or spindle of a tooling machine by means of which the body can be brought to rotate around a center axis CL. The forward part of the end mill has a number of spaced recesses 11 round the periphery, each of which includes a pocket 12 confined by a bottom support surface 14 and one or more side supporting surfaces upstanding therefrom to receive a releasable clamped indexable insert 13 in a work position therein. Alternatively a number of cutting inserts can furthermore be piled (stacked) axially in matching pockets in said milling body.

A plane of the bottom surface 14 of said pocket 12 forms a positive axial angle α with the axis CL simultaneously as it is provided at negative radial angle from a radial plane. The size of this positive axial angle α should be chosen in the area of 0–20°, suitably 5–15°. The positive axial angle α will enable the chips to be easily lifted and thrown away from the workpiece. The indexable insert 13 is preferably intended to be fastened in said pocket 12 by means of a clamp screw (not shown) which is received through a central aperture 15 of the insert and threadably engaged in the milling body 10. The axis of said aperture 15 is preferably perpendicular to the bottom face of said insert.

Figure 3:
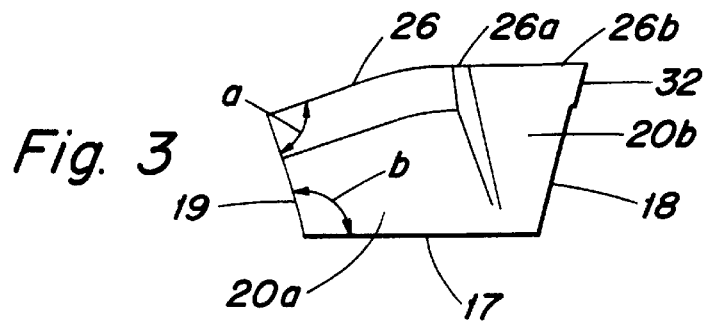
FIG. 3 shows an end view of the cutting insert according to FIGS. 1–2.

The indexable insert 13 is essentially formed as a parallelogram, as viewed in plan. The insert includes two essentially parallel rectangular side faces, a top face 16 and a bottom face 17 which faces may be mutually angled away from each other in the manner described in U.S. application Ser. No. 09/305,464 (Swedish Application No. 9801576-1). Between the top and bottom faces extend two identical longitudinal side surfaces 18, 19 and two identical end faces 20, 21 essentially perpendicularly oriented from said top and bottom faces wherein said each of the side surfaces 18, 19 has a considerably larger longitudinal length than the laterally extending end faces 20, 21. Each of the side surfaces 18, 19 has an increasing width (height) W towards the respective active cutting corner (see FIG. 1) while being generally inclined at an acute angle a from the top face 16 and at an obtuse angle b from the bottom surface 17 (see FIG. 3). First portions 20a, 21a of the end faces are formed on cutting corners 22, 23, respectively, located in diametrically opposite corners which protrude axially from the remainder of said insert. Each of the intersection lines between the side surface 18, 19 and the top surface 16 of the cutting insert forms a main cutting edge 24 and 25. Each end face 20, 21 includes the first portion 20a, 21a which intersects the top face 16 to form a first end edge 26, 27 and a second portion 20b, 21b which intersects the top face 16 to form a second end edge 26b, 27b. The first end edges 26, 27 define secondary cutting edges that are offset outwardly relative to respective ones of the second end edges 26b, 27b and are disposed essentially right-angled in relation to respective ones of said main cutting edges on said protruding parties 22 and 23 respectively intended to plane out the machined surface of the workpiece and achieve an improved surface finish. The main cutting edge and secondary cutting edge are separated in each corner by a smoothly rounded corner edge 28 or 29, the curvature of which is chosen such that during machining of the workpiece a curved portion with radius 0.4–6.4 mm is obtained. In order to obtain strengthening of the edges a narrow chamfer 30 has been provided along the main cutting edges 24, 25 with a suitable width, while a somewhat wider bevel face 31 has been provided along said secondary cutting edges 26, 27. The bevel face 31 extends with substantially constant width along the entire end face 20, 21. Additionally, there is a smoothly curved edge portion 26a, 27a, interconnecting the secondary cutting edge 26, 27 with a respective second end edge 26b, 27b. This edge portion 26a, 27a is intended to be an active edge during axial ramping and drilling. This curved radius becomes successively larger at positions more remote from the respective secondary cutting edge 26 or 27.

The longitudinal side surfaces 18, 19 are designed with increasing width W towards the active cutting corner so that the cutting corner and the curved corner edge 28, 29 become situated on an elevated portion of the cutting insert. The cutting insert is simultaneously formed such that both the side surfaces 18, 19 and the end faces 20, 21 form a positive clearance angle along the entire cutting edge in relation to the top face 16 of the cutting insert. It is furthermore distinguishing that the longitudinal side surfaces 18, 19 of the cutting insert appear with wave shaped primary clearance surfaces 32 along the entire main cutting edge 24 (similarly along the main cutting edge 25), with large axial inclination from one edge face 21 and downwards towards the other end face 20. It is to be noticed that this primary clearance surface 32 is provided on a portion that is protruding laterally from the remainder of the insert which via a step clearance with certain radius extends into the secondary helically twisted clearance surface 18, formed such that its clearance angle increases with increasing cutting depth. The primary clearance surface 32 and the adjacent main cutting edge 24, 25 are smoothly S-curved in the longitudinal direction. The primary clearance surface 32 is formed with essentially constant width along its entire length.

Figure 4:
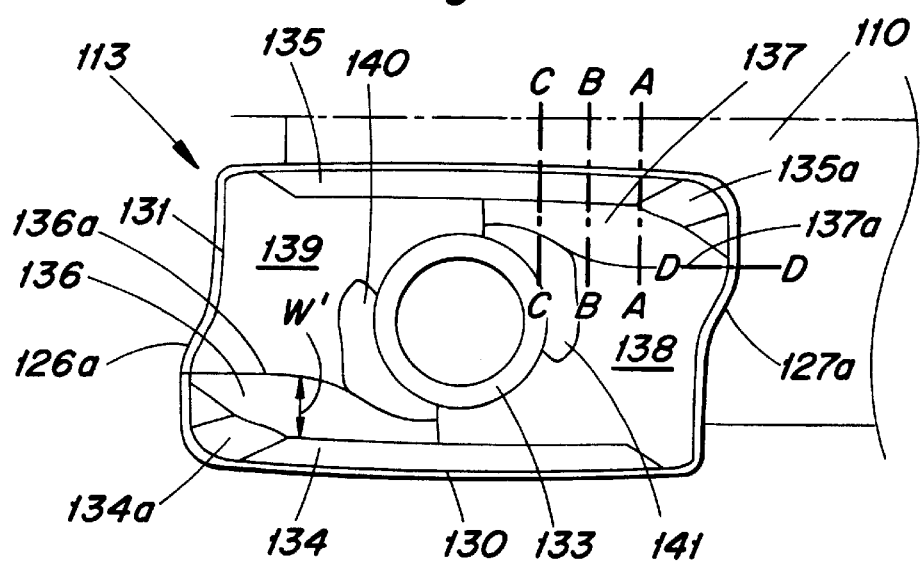
FIG. 4 shows a top plan view of an alternative embodiment of the insert of the invention.
Figure 9:
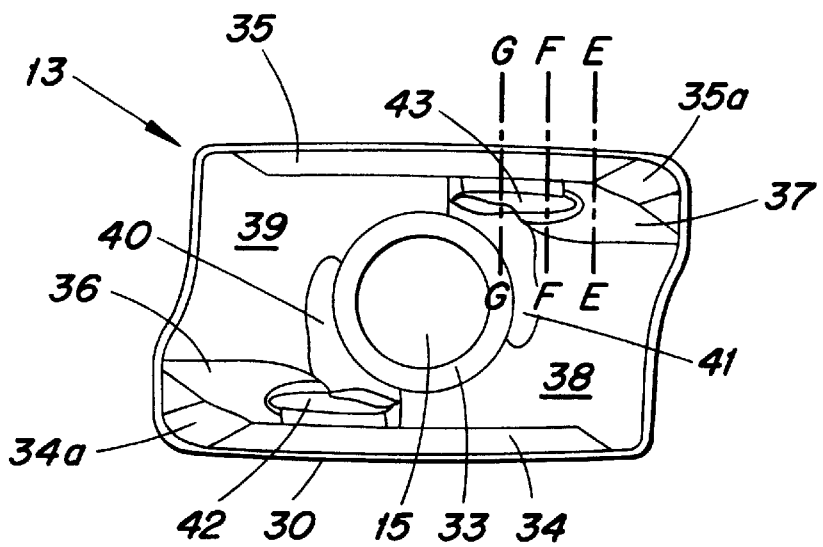
FIG. 9 shows a top plan view of the insert shown in the tool of FIG. 2.
Figure 10:
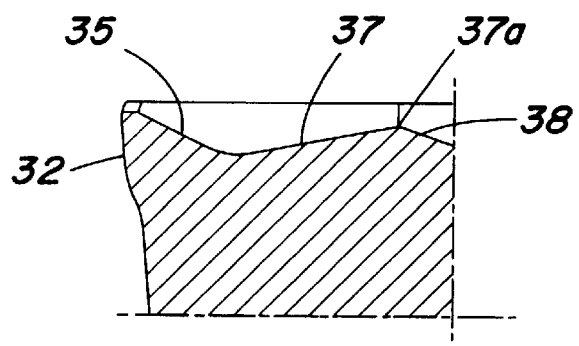
FIG. 10 shows a sectional view taken along line E—E in FIG. 9.
Figure 11:
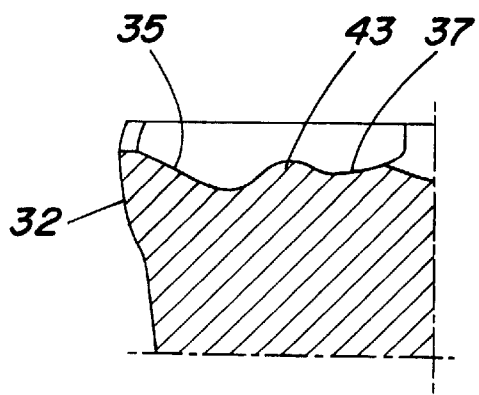
FIG. 11 shows a sectional view taken along line F—F in FIG. 9.
Figure 12:
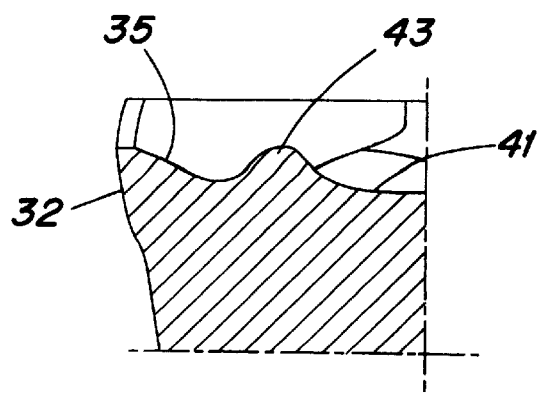
FIG. 12 shows a sectional view taken along the line G—G in FIG. 9.

The detailed form of the top face 16 of the insert appears best in FIG. 2, FIG. 4, FIG. 9 and from the corresponding sectional views in FIGS. 5–9 and FIGS. 10–12. Hence, the top face has a recessed flat central surface 33 (or 133) round the center hole 15 (or 115). The surrounding surfaces are elevated therefrom. Adjacent every main cutting edge next to the chamfer 30 (or 130) there are disposed obliquely downwards inclined or sloping surfaces 34 and 35 (or 134 and 135) which are helically shaped in the longitudinal direction in order to act as primary rake surfaces. This rake face 34, 35 (or 134 and 135) has constant width along the entire main cutting edge 24, 25 (or 124 and 125). Each of the sloping surfaces 34, 35 extends to a respective cutting corner where it transforms into a portion 34a, 35a of increased width. Each sloping surface extends to an upwardly inclined surface 36, 37 defining a secondary chip breaking surface.

Figures 5, 6:
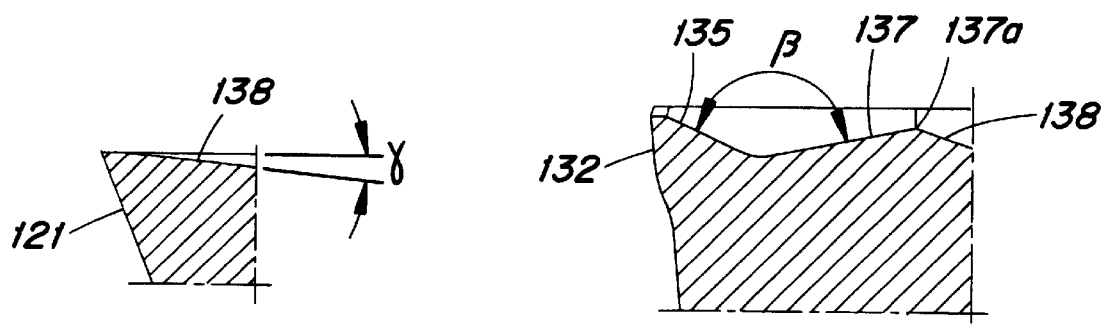
FIG. 5 shows a sectional view taken along line D—D in FIG. 4.
FIG. 6 shows a sectional view taken along the line A—A in FIG. 4.
Figure 7:
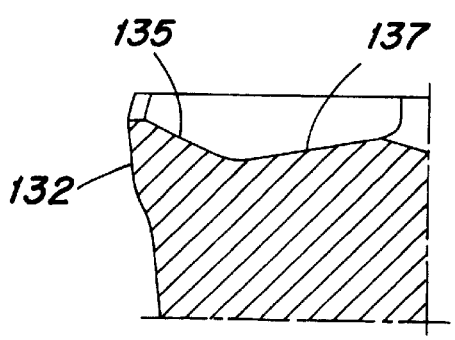
FIG. 7 shows a sectional view of the cutting insert taken along the line B—B in FIG. 4.
Figure 8:
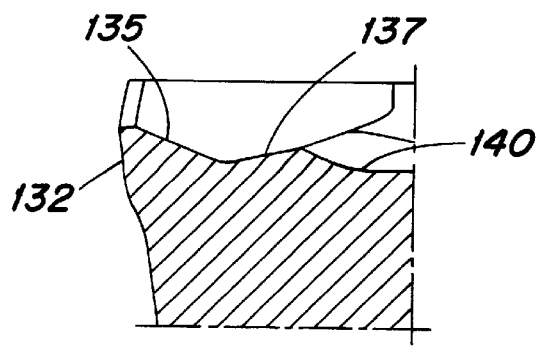
FIG. 8 shows a sectional view along the line C—C in FIG. 4.

In the embodiment shown in FIG. 4, an insert 113 is depicted whose portions corresponding to the insert 13 are given the same reference numerals increased by one hundred. A portion of the rake faces 134, 135 is located adjacent an upwardly inclined surface 136, 137 intended to act as a secondary chip breaking surface having an increasing width W' towards the axially protruding cutting corners 122, 123, said width then diminishing towards said portions 122, 123. At the cross section taken at the transition area between the chamfer 130 and the curved radius 126a, 127a, said inclined surface 136, 137 meets a ridge 136a, 137a adjacent a downwards inclined surface 138, 139, which surface 138, 139 has a convexly curved shape and extends all the way down to the intersection with the opposed rake face 134. In a direction toward the insert center, said secondary chip face 136, 137 extends to meet a recessed surface 140, 141, the level of which is somewhat elevated in comparison with the surface 133 that extends as an annular surface all around the aperture 115. This recessed surface 140, 141 is also the transition surface located between the central portion of the convexly curved surface 138, 139 and the center of the insert. There should be such inclination of surfaces 135 and 137 so that the obtuse angle β therebetween (FIG. 6) amounts to 130–160°, preferably 140–150°. The more narrow angular range should be selected for the less heavy machining of a workpiece. The chip angle γ provided by the rake face 138 along section line D—D in FIG. 4 should be no larger than 10° as shown in FIG. 5. As appears from FIG. 2, FIG. 4 and FIG. 9, the portion of inclined surface 134, 135 located adjacent the curved edge 128, 129 ought to be smoothly curved while having a width larger than the width than the width of said surfaces 134, 135 extending along the main cutting edge. As a consequence thereof, the width of said secondary chip face 136, 137 will appear with diminishing width when approaching the secondary cutting edge 126, 127.

In FIG. 2 and FIG. 9 there is shown an embodiment where the insert 13 has been provided with an elongated protrusion 42, 43 that extends parallel with the main cutting edge 24, 25, said protrusion being located on the upward slope of the surface 36, 37 while having a convex cross-sectional contour. Hence, the protrusion 43 is located at a certain distance from the intersection line between surfaces 35 and 37 while being parallel with main cutting edge 25 and, in the same manner, the protrusion 42 is located at a certain distance from the intersection between the surfaces 34 and 36 while extending parallel with the main cutting edge 24. The longitudinal extension of the protrusion 42, 43 should amount to 0.8–1.2 times, preferably 0.9–1.1 times, the size of the diameter of the central aperture 15.

Thanks to the arrangement above described a new insert has been provided for a cutting tool that becomes useful at large cutting speeds in difficult machining operations such as in slotting cutters machining long chip producing materials, as well as ramping or end milling operations in such difficult materials. At the same time, very high precision and good finish of the machined surface is possible to achieve. Although the insert has been described as a prismatically elongated insert for end mills it is to be understood that a corresponding optimization of the primary and secondary rake faces, as well as those protrusions provided, could similarly be applied to other polygonal shapes of the insert, such as square-shaped rhombic or diamond shaped inserts.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. In a cutting insert for chip forming machining, which comprises a basically polygonal body including a top face, a planar bottom face, two side surfaces extending between the top face and the bottom face and intersecting the top face to form two main cutting edges, and two end faces extending between the top face and the bottom face, a first portion of each end face intersecting the top face to form a first end edge, a second portion of each end face intersecting the top face to form a second end edge, each first end edge defining a secondary cutting edge and being offset outwardly relative to the respective second end edge, wherein each secondary cutting edge is disposed on a protruding cutting corner wherein each main and secondary cutting edge has a chamfer, wherein each of said peripheral side surfaces has a width increasing towards the respective cutting corner such that the cutting corner becomes situated on a raised portion of the insert body, the top face including sloping surfaces extending inwards from said chamfers of said main and secondary cutting edges and at least one upper chip surface arranged inside each of said sloping surfaces while extending towards a center of the insert so as to provide chip curling zones therebetween, the improvement wherein:

a) each of the peripheral side surfaces is inclined at an acute angle from the top face wherein upper portions of the peripheral surfaces define clearance surfaces, each clearance surface and a lower portion of the respective peripheral side surface having a generally helical contour along their entire length, b) each of the sloping surfaces forming a primary chip breaking surface next to the respective main cutting edge and extending generally helically along its entire length and having a constant width along the entire main cutting edge, and c) each of the primary chip breaking surfaces extending inwards to an upwardly inclined surface defining a secondary chip breaking surface such that a V-shaped chip-curling cavity is formed therebetween.

2. Cutting insert according to claim 1, wherein each of the chamfers has a width extending along the respective main cutting edge, which width is smaller than a width of each chamfer extending along a secondary cutting edge.

3. Cutting insert as defined in claim 1, wherein a portion of the sloping surface located adjacent the respective cutting corner is in the form of a portion with smoothly curved surface contour having a width that is larger than a width of said sloping surfaces extending along the main cutting edge.

4. Cutting insert as defined in claim 3, wherein each secondary chip breaking surface has a width that is first increasing and then decreasing in a direction from a center region of the upper chip surface to a respective cutting corner.

5. Cutting insert as defined in claim 1 wherein each secondary chip breaking surface extends into a ridge located at a downwards inclined surface having a substantially convexly curved contour.

6. Cutting insert as defined in claim 1 wherein each primary chip breaking surface forms an obtuse angle with its respective secondary chip breaking surface in the range of 130–160°.

7. Cutting insert according to claim 6 wherein the obtuse angle is in the range of 140–150°.

8. Cutting insert according to claim 1 wherein an elongated protrusion is provided on the upwardly inclined secondary chip forming surface at a distance from an intersection between the primary and secondary chip forming surfaces.

9. Cutting insert according to claim 8, wherein the insert includes a central aperture, an extension of each of the protrusions being in the range of 0.8–1.2, times the size of a diameter of the central aperture of the insert.

10. Cutting insert according to claim 9 wherein the range is 0.9–1.1.

11. Cutting insert according to claim 8 wherein each of the protrusions is oriented parallel with a respective main cutting edge, and a cross-section of said protrusion has a convexly curved contour.

12. Cutting insert according to claim 1 wherein the body is in the shape of a prismatically elongated body where the main cutting edges extend in a longitudinal direction of said insert.

13. Cutting insert according to claim 1 wherein the insert has a central hole that extends entirely through the insert in a direction perpendicular towards the bottom surface of said insert.

* * * * *